United States Patent
Nakanishi

[11] Patent Number: 5,225,734
[45] Date of Patent: Jul. 6, 1993

[54] VIBRATION WAVE DRIVEN MOTOR

[75] Inventor: Toru Nakanishi, Yokohama, Japan

[73] Assignee: Canon Kabushiki Kaisha, Tokyo, Japan

[21] Appl. No.: 961,039

[22] Filed: Oct. 14, 1992

Related U.S. Application Data

[63] Continuation of Ser. No. 663,426, Mar. 1, 1991, abandoned.

[30] Foreign Application Priority Data

Mar. 1, 1990 [JP] Japan ................... 2-50202

[51] Int. Cl.⁵ .............................. H01L 41/08
[52] U.S. Cl. ...................... 310/323; 310/341
[58] Field of Search .............. 310/323, 328, 341-344

[56] References Cited

U.S. PATENT DOCUMENTS

| | | | |
|---|---|---|---|
| 2,371,193 | 3/1945 | Sigmund et al. | 310/87 |
| 3,104,335 | 9/1963 | Shoor | 310/341 |
| 3,242,723 | 3/1966 | Evans | 310/341 |
| 3,555,319 | 1/1971 | Schafer | 310/87 |
| 3,700,937 | 10/1972 | Rissolo | 310/341 |
| 4,262,226 | 4/1981 | Erickson | 310/87 |
| 4,959,579 | 9/1990 | Kuwabara et al. | 310/323 |
| 4,980,599 | 12/1990 | Kuwabara et al. | 310/323 |

FOREIGN PATENT DOCUMENTS 63-73887 4/1988 Japan.

Primary Examiner—Mark O. Budd
Attorney, Agent, or Firm—Fitzpatrick, Cella, Harper & Scinto

[57] ABSTRACT

In a vibration wave driven motor which has a vibration member for forming a travelling vibration wave in a resilient member by an AC voltage being applied to an electro-mechanical conversion element adhesively secured to the resilient member, and a member urged against the vibration member with pressing means interposed therebetween and in which the member and the vibration member are moved relative to each other by the travelling vibration wave formed in the resilient member, there is provided forcibly cooling means for forcing a cooling medium to circulate in the heat generating portion of the motor to thereby cool the same.

9 Claims, 1 Drawing Sheet

VIBRATION WAVE DRIVEN MOTOR

This application is a continuation of application Ser. No. 07/663,426 filed Mar. 1, 1991 now abandoned.

BACKGROUND OF THE INVENTION

1. Field of the Invention

This invention relates to a vibration wave driven motor in which a movable member is frictionally driven by a travelling vibration wave, and to a cooling structure for cooling a heat generating portion.

2. Related Background Art

A proposal relating to the structure of a vibration wave driven motor utilizing the bending vibration of a piezo-electric member has been made by Japanese Laid-Open Patent Application No. 63-73887.

This proposal provides:

1) a compact vibration wave driven motor;
2) a vibration wave driven motor excellent in heat radiating property;
3) a vibration wave driven motor of high efficiency; and
4) a vibration wave driven motor in which pressure force regulation is easy.

The principle of driving of a vibration wave driven motor is known and therefore will hereinafter be described not in detail, but briefly.

In a vibration wave driven motor, an electro-mechanical energy conversion element, for example, a piezo-electric element is adhesively secured to one side of a resilient member made of a metal and formed, for example, into a circular ring shape, and AC voltages differing in phase from each other are applied to two groups of driving piezo-electric elements formed on said piezo-electric element to thereby excite two standing waves on the resilient member, and a travelling vibration wave which is a bending vibration is formed by the combination of these standing waves.

On the other hand, for example, a member of circular ring shape is pressed against the other side of the resilient member with pressing means such as a spring interposed therebetween, and this member or the resilient member is moved by frictional driving provided by a travelling vibration wave formed in the resilient member.

An example of the prior art will hereinafter be described with reference to FIG. 3 of the accompanying drawings.

The reference numeral 2 designates the cover of a motor, and the reference numeral 1 denotes the case of the motor. A piezo-electric member 4 is secured to a resilient member 3 of circular ring shape, and these constitute a stator (a vibration member) 5.

The motor is of such structure that the stator 5 generates heat by heat energy created by strain caused by the supply of electric power to the piezo-electric member 4 and the temperature rise of the motor by the heat generation of the stator is conducted from the stator 5 to the cover 2 and the case and is radiated thereby.

The reference numeral 8 designates a rotor constructed by a slider 7 being secured to a ring 6. This rotor 8 is adapted to be urged against the stator 5 by the pressure force of a countersunk spring 10 with a rubber member 9 interposed therebetween, and to be rotated with a shaft 11. The pressure force can be very easily regulated because the thickness of a shim 12 is suitably chosen and regulated and then the shim is held by a snap ring 13. The shaft 11 is rotatably supported by bearings 14 and 15 mounted in the case 1 and the cover 2, respectively.

Now, in the above-described example of the prior art, the transmission routes of the heat energy created in the stator 5 during driving include three routes, i.e., the heat radiation from the surface of the stator 5, the route from the driving surface to the rotor, and the route from the thin-walled portion 3-a of the stator through a stator mounting portion- 3-b to the cover 2 and the case 1. Of these, the radiated heat from the surface of the stator 5 and the heat energy conducted to the rotor 8 are very slight. Thus, most of the heat energy is conducted and radiated through the third route, i.e., the route from the thin-walled portion 3-a of the stator via the mounting portion 3-b to the cover 2 and the case 1.

In this case, the quantity of heat conducted per unit time is proportional to the cross-sectional area perpendicular to the direction of conduction. Therefore, in the example of the prior art, the cross-sectional area of the thin-walled portion for endowing the stator with flexibility is very small and the quantity of heat which can be conducted and radiated to the outside of the motor per unit time is very small. This has resulted in the overheating of the stator 5 which in turn has sometimes led to the deterioration of the motor characteristic by the temperature dependency of the stator resonance frequency, or to the reduced strength or peeling-off of the adhesive which secures the piezo-electric member 4 to the resilient member 3.

SUMMARY OF THE INVENTION

It is an object of the present invention to provide a vibration wave driven motor in which a reduction in the motor performance by overheating can be prevented.

It is another object of the present invention to provide a vibration wave driven motor which suffers little from the peeling-off of a driving piezo-electric element and a reduction in the strength of adhesive securing.

Other objects of the present invention will become apparent from the following detailed description of the invention.

One aspect of this invention is a vibration wave driven motor which has a vibration member for forming a travelling vibration wave in a resilient member by an AC voltage being applied to an electro-mechanical energy conversion element adhesively secured to said resilient member, and a member urged against said vibration member with pressing means interposed therebetween and in which said member and said vibration member are moved relative to each other by the travelling vibration wave formed in said resilient member, characterized by forcibly cooling means for forcing a cooling medium to circulate in the heat generating portion of the motor to thereby cool the same.

DETAILED DESCRIPTION OF THE PREFERRED EMBODIMENTS

Figure 1:
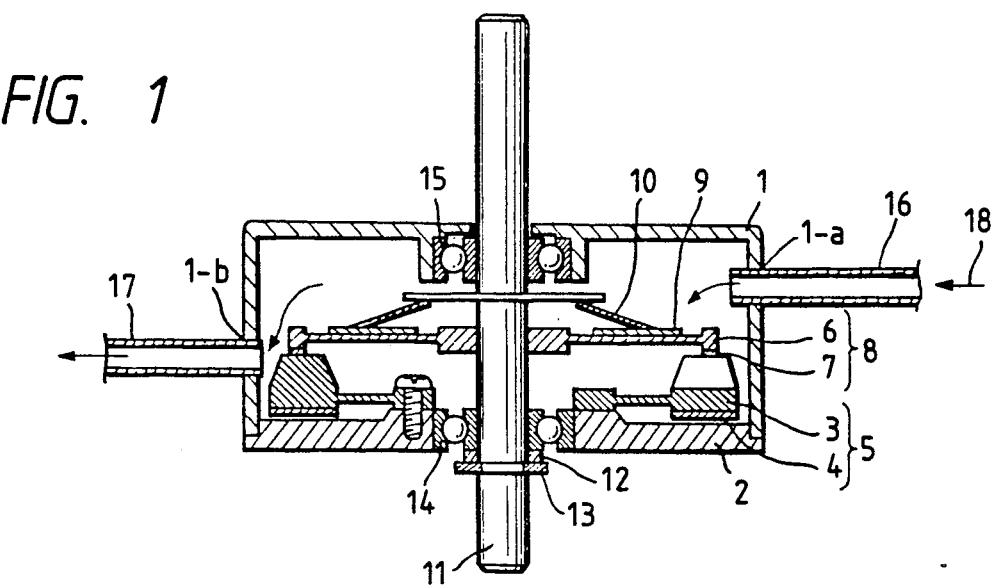
FIG. 1 is a cross-sectional view showing Embodiment 1 of a vibration wave driven motor according to the present invention.

The present invention will hereinafter be described in detail with respect to embodiments thereof shown in the drawings.

Figure 3:
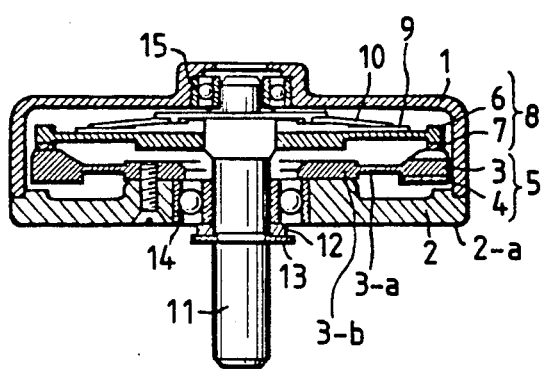
FIG. 3 is a cross-sectional view of a vibration wave driven motor according to the prior art.

In the description of the embodiments, members of the same structure as those in the example of the prior art shown in FIG. 3 are given the same reference characters and need not be described.

EMBODIMENT 1

FIG. 1 is a cross-sectional view showing Embodiment 1 of a vibration wave driven motor according to the present invention.

The present embodiment is such that a cooling medium 18 such as air is introduced into a hermetically sealed space formed by a case 1 and a cover 2 and containing a stator 5 and a rotor 8 therein to thereby forcibly cool the stator 5, etc.

The reference numeral 16 designates a cooling medium introduction pipe inserted into a hole 1-a formed in the side wall of the case 1, and the reference numeral 17 denotes a discharge pipe inserted into a hole 1-b formed at a location symmetrical with the hole 1-a and in opposed relationship with the stator 5. The cooling medium 18 supplied from cooling medium charging means, not shown, is supplied into the case 1 through the cooling medium introduction pipe 16.

The cooling medium 18 supplied into the case 1 circulates in the case 1 and absorbs the heat of the stator 5 and the interior of the motor, and is discharged out of the case through the discharge pipe 17.

EMBODIMENT 2

Figure 2:
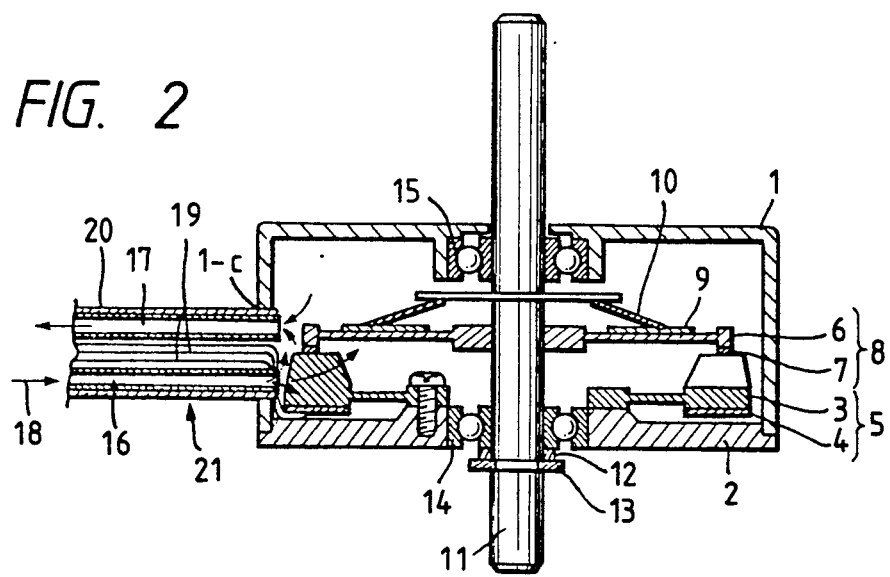
FIG. 2 is a cross-sectional view showing Embodiment 2.

FIG. 2 is a cross-sectional view showing Embodiment 2.

In the above-described Embodiment 1, the cooling medium introduction pipe 16 and the discharge pipe 17 are provided at symmetrical locations, while in the present embodiment, the cooling medium introduction pipe 16, the discharge pipe 17 and the lead wire 19 of the piezo-electric member 4 are bundled as a unit by a covering 20 to form a lead wire pipe bundle 21, which is inserted into a hole 1-c formed in the side wall of the case 1. The cooling medium introduction pipe 16 is provided in opposed relationship with the resilient member 3 and the discharge pipe 17 is provided above it.

Again in the present embodiment, as in Embodiment 1, the cooling medium 18 circulates in the case 1 and thereby absorbs the heat of the stator 5 and the interior of the motor, and is discharged through the discharge pipe 17.

As described above, according to the present invention, the cooling medium is circulated in the heat generating portion of the motor to cool it, whereby it becomes possible to prevent the overheating of the vibration member having strong temperature-dependency and stabilize the performance of the motor.

Also, the reduced strength or peeling-off of the adhesive which secures the electromechanical energy conversion element such as the piezo-electric member to the vibration member caused by temperature rise can be prevented to improve reliability.

Further, by the motor being cooled, the heat conduction to the motor mounting portion can be descreased to eliminate the influence of heat.

Also, the present invention is very effective in a case where dust-proofing is required and the interior of the motor need be hermetrically sealed.

What is claimed is:

1. A vibration wave driven motor, comprising:
    a vibration member for generating a travelling vibration wave therein in response to an electrical signal applied thereto;
    a rotor provided in contact with the vibration member for receiving the travelling vibration wave;
    a cooling medium introduction pipe;
    a cooling medium discharge pipe;
    a seal member for sealing the vibration member and the rotor, the seal member having a hole formed in a side thereof to mount said cooling medium introduction pipe and to mount said cooling medium discharge pipe;
    an output shaft engaged with the rotor to take out the rotation of the rotor;
    a bearing mounted on said seal member to rotatably support said output shaft; and
    a cover medium for covering at least the introduction pipe and discharge pipe.

2. A motor according to claim 1, wherein said vibration member has a circular ring shape.

3. A motor according to claim 2, wherein a portion of said vibration member of said circular ring shape is arranged in contact with said seal member.

4. A motor according to claim 1, wherein said vibration member has an electro-mechanical energy conversion element to which the electrical signal is supplied, and a resilient member to which the element is adhesively secured.

5. A vibration wave driven motor according to claim 1, wherein said vibration member has a resilient member, an electro-mechanical energy conversion element for generating the traveling vibration wave in the resilient member, and a lead line for applying an electrical energy to the element.

6. A vibration wave driven motor according to claim 5, wherein said cover member covers the introduction pipe, the discharge pipe and the lead line.

7. A vibration wave driven motor according to claim 6, wherein a leading edge of said introduction pipe faces the portion of said vibration member.

8. A vibration wave driven motor according to claim 7, wherein said discharge pipe is provided above said introduction pipe.

9. A vibration driven motor, comprising:
    a vibration member for generating a vibration therein in response to an electrical signal applied thereto;
    a contact member provided in contact with the vibration member for receiving the vibration;
    a cooling medium introduction pipe;
    a cooling medium discharge pipe;
    a seal member for sealing the vibration member and the contact member, the seal member having a hole formed in a side thereof to mount said cooling medium introduction pipe and to mount said cooling medium discharge pipe; and
    a cover member for covering at least the introduction pipe and discharge pipe.

* * * * *